United States Patent
Zhang

(10) Patent No.: US 8,320,548 B2
(45) Date of Patent: Nov. 27, 2012

(54) METHOD FOR PROCESSING THE BUSYNESS OF FLEXIBLE ALERT GROUP WITH MULTI-USER TYPE

(75) Inventor: Qiang Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 239 days.

(21) Appl. No.: 12/668,878

(22) PCT Filed: Nov. 30, 2007

(86) PCT No.: PCT/CN2007/003406
§ 371 (c)(1),
(2), (4) Date: Jan. 12, 2010

(87) PCT Pub. No.: WO2009/012627
PCT Pub. Date: Jan. 29, 2009

(65) Prior Publication Data
US 2010/0183133 A1 Jul. 22, 2010

(30) Foreign Application Priority Data
Jul. 24, 2007 (CN) ............................ 2007 1 0136359

(51) Int. Cl.
*H04M 3/42* (2006.01)
(52) U.S. Cl. ......... 379/211.04; 379/207.02; 379/207.07; 379/202.01; 379/209.01; 379/88.25
(58) Field of Classification Search ............. 379/211.04, 379/202.1, 204, 207.02, 207.04, 88.13; 709/220, 709/227; 455/67.11, 435.1, 411, 423
See application file for complete search history.

(56) References Cited

U.S. PATENT DOCUMENTS
5,206,901 A * 4/1993 Harlow et al. ........... 379/211.04
(Continued)

FOREIGN PATENT DOCUMENTS
CN 1543110 A 11/2004
(Continued)

OTHER PUBLICATIONS
3GPP TS 33.210 version 5.0.0 (2002-2003), 19 pages.*

*Primary Examiner* — Joseph J Nguyen
(74) *Attorney, Agent, or Firm* — Sawyer Law Group, P.C.

(57) ABSTRACT

A method for processing the busyness of flexible alert group with multi-user type, the method comprises: a caller dials a guiding number of Flexible Alert (FA), and the calling is connected to an application server, the application server acquires member numbers of the FA group based on the guiding number, and establishes the callings to each member in the FA group; when one member in the FA group returns a busyness message, if the FA is of the multi-user type, the application server continues waiting for the response from other members in the FA group; and if one member in the FA group hooks off and answers, the application server establishes a session from the caller to the member that hooks off and answers, and releases all the callings to the other members in the FA group; if all the members in the FA group return busyness messages, the application server returns FA group being busy to the caller. In the present invention, the processing of busyness of FA group with multi-user type is achieved by means of AS, the interaction and the process flow are simplified, and the efficiency for processing the busyness of FA group with multi-user type is increased, thus the user's experience is improved.

5 Claims, 3 Drawing Sheets

U.S. PATENT DOCUMENTS

| | | | | |
|---|---|---|---|---|
| 5,387,905 A | * | 2/1995 | Grube et al. | 340/9.11 |
| 5,502,762 A | * | 3/1996 | Andrew et al. | 379/202.01 |
| 5,506,890 A | * | 4/1996 | Gupta et al. | 379/88.25 |
| 5,802,160 A | * | 9/1998 | Kugell et al. | 379/211.04 |
| 6,272,216 B1 | * | 8/2001 | Vaios | 379/265.01 |
| 6,625,258 B1 | * | 9/2003 | Ram et al. | 379/88.13 |
| 6,801,613 B1 | * | 10/2004 | Hamilton | 379/207.02 |
| 7,688,962 B1 | * | 3/2010 | Knoerle et al. | 379/211.04 |
| 2003/0040280 A1 | * | 2/2003 | Koskelainen | 455/67.1 |
| 2003/0229699 A1 | * | 12/2003 | Moran et al. | 709/227 |
| 2004/0015569 A1 | * | 1/2004 | Lonnfors et al. | 709/220 |
| 2007/0041550 A1 | * | 2/2007 | McLarty et al. | 379/211.02 |

FOREIGN PATENT DOCUMENTS

EP    1739916 A1    1/2007

* cited by examiner

METHOD FOR PROCESSING THE BUSYNESS OF FLEXIBLE ALERT GROUP WITH MULTI-USER TYPE

FIELD OF THE INVENTION

The present invention relates to communication field, in particular to a method for processing the busyness of a flexible alert (FA) group with multi-user type in an IP multimedia subsystem (IMS).

BACKGROUND

Flexible alert (FA) is a service for prompting a user group which has a guiding number and one or more member numbers. When the guiding number is dialed, the calling will be connected to each member and all the members receive alert simultaneously. When one member hooks off and answers the phone, a session will be established between the caller and the member, the rest of the calling branches will be released.

FA can be classified into two types, namely, single-user type and multi-user type. In a single-user type FA, when one member is busy, the FA group is busy, while in a multi-user type FA, the FA group is busy only when all the members are busy.

In prior art, whether a FA group is busy or not is determined by the home location register (HLR), the network architecture of which is shown in FIG. 1. As shown in FIG. 1, the user equipments (UE) (101, 107) are user terminals representing the caller or one member of FA. BTS/BSC (102, 106) are base station and base station controller, MSC/VLR (103, 105) are mobile switched center/visited location register, and HLR (104) is a home location register.

FIG. 2 shows a processing flow of the busyness of flexible alert (FA) group with multi-user type in prior art. As shown in FIG. 2, HLR sends route requests to the serving MSC of each member of FA (203/205) when receiving a location request from the calling MSC (202). If the user is idle, the serving MSC returns a temporary location digit number (TLDN) (204). If the user is busy, the serving MSC returns the user is busy (206). Then the HLR returns the TLDN1 of UE1 to the calling MSC because the FA is multi-user type (207). At last, the calling MSC initiates the establishment of a calling to TLDN1 to the serving MSC (208).

Based on demand, FA needs to be implemented in a IP media sub-system (IMS). The network structure of IMS is shown in FIG. 3. The UE (301) represents a user equipment involving a calling, which can be a calling equipment or a called equipment. P-CSCF (302) represents proxy-call session control function, it is the session entrance point where a UE is accessed to the IMS network, and is responsible for forwarding the session between a UE and the network. S-CSCF (303) represents serving-call session control function; it is responsible for handling the session request from a UE and performing the initial filtering rule. AS (304) is an application server and responsible for providing service of a UE, such as processing FA service.

In the prior art IMS standards, the problem existed in realizing FA is that no status information representing user busyness is stored in network, thus it cannot be realized to determine directly that a user is busy. Generally, user busyness is determined by a terminal. When a user receives a new session request, if the user is in another session or processing other services, the user returns information of user busyness to the network. For a multi-user type FA, it is only possible of the network to determine that the FA group is busy when all members return information of user busyness. In addition, it is apparent from above description that the interaction for processing the busyness of a FA group with multi-user type via HLR is extraordinary complex, thus resulting in low efficiency in the process.

SUMMARY OF THE INVENTION

The present invention is made considering above problem in the prior art, and provides a method for processing busyness of a flexible alert (FA) group with multi-user type, wherein application server (AS) not home location register (HLR) processes busyness of FA group with multi-user type.

The method for processing busyness of FA group with multi-user type according to the present invention comprises: a caller dials a guiding number of Flexible Alert, FA, and the calling is connected to an application server, the application server acquires member numbers of the FA group based on the guiding number, and establishes the callings to each member in the FA group; when one member in the FA group returns a busyness message, if the FA is of the multi-user type, the application server continues waiting for the response from other members in the FA group; and if one member in the FA group hooks off and answers, the application server establishes a session from the caller to the member that hooks off and answers, and releases all the callings to the other members in the FA group; if all the members in the FA group return busyness messages, the application server returns FA group being busy to the caller.

Wherein, the process that the calling is connected to the application server further comprises: the calling is connected to the Serving-Call Session Control Function (S-CSCF) to which the guiding number belongs; and the S-CSCF forwards the session request to the application server which processes FA service according to a filter.

The process that the application server acquires member numbers of the FA group based on the guiding number, and establishes the callings to each member in the FA group further comprises: the application server judges the calling is a FA calling, inquires a member list of the FA group, and acquires the member numbers of the FA group; and the application server sends calling request to all the members in the FA group via the S-CSCF and Proxy-Call Session Control Function (P-CSCF).

In particular, the application server can simultaneously send the calling request to all the members in the FA group.

In addition, the process that one or more members in the FA group return busyness message is: one or more members in the FA group return the busyness message to the application server via the P-CSCF and the S-CSCF. The process that one or more members in the FA group return off-hook and answering comprises: one or more members in the FA group return the off-hook and answering to the application server via the P-CSCF and the S-CSCF.

In the present invention, the processing of busyness of FA group with multi-user type is achieved by means of AS, the interaction and the process flow are simplified, and the efficiency for processing the busyness of FA group with multi-user type is increased, thus the user's experience is improved.

Other features and advantages of the present invention will be illustrated in the following specification, and partly apparent from the specification or appreciated through implementing the present invention. The purpose of the present invention and other advantages can be achieved through the structure specified in the specification, claims and drawings.

BRIEF DESCRIPTION OF THE DRAWINGS

The drawings provide a further understanding to the present invention and form a part of the specification, as well as explain the present invention together with the embodiments. However, the drawings do not limit the present invention.

DETAILED DESCRIPTION

The preferred embodiments of the present invention will be described in connection with the drawings. It shall be understood that the preferred embodiments described herein is provided for illustrating and explaining the present invention not for limiting the present invention.

According the embodiments of the present invention, a method for processing the busyness of a flexible alert (FA) group with multi-user type is provided; the method is based on an application server (AS).

Figure 1:
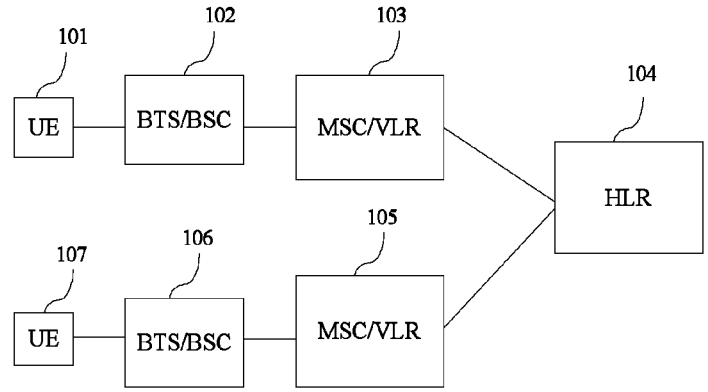
FIG. 1 is a schematic diagram showing the circuit domain frame of flexible alert (FA) according to prior art.
Figure 2:
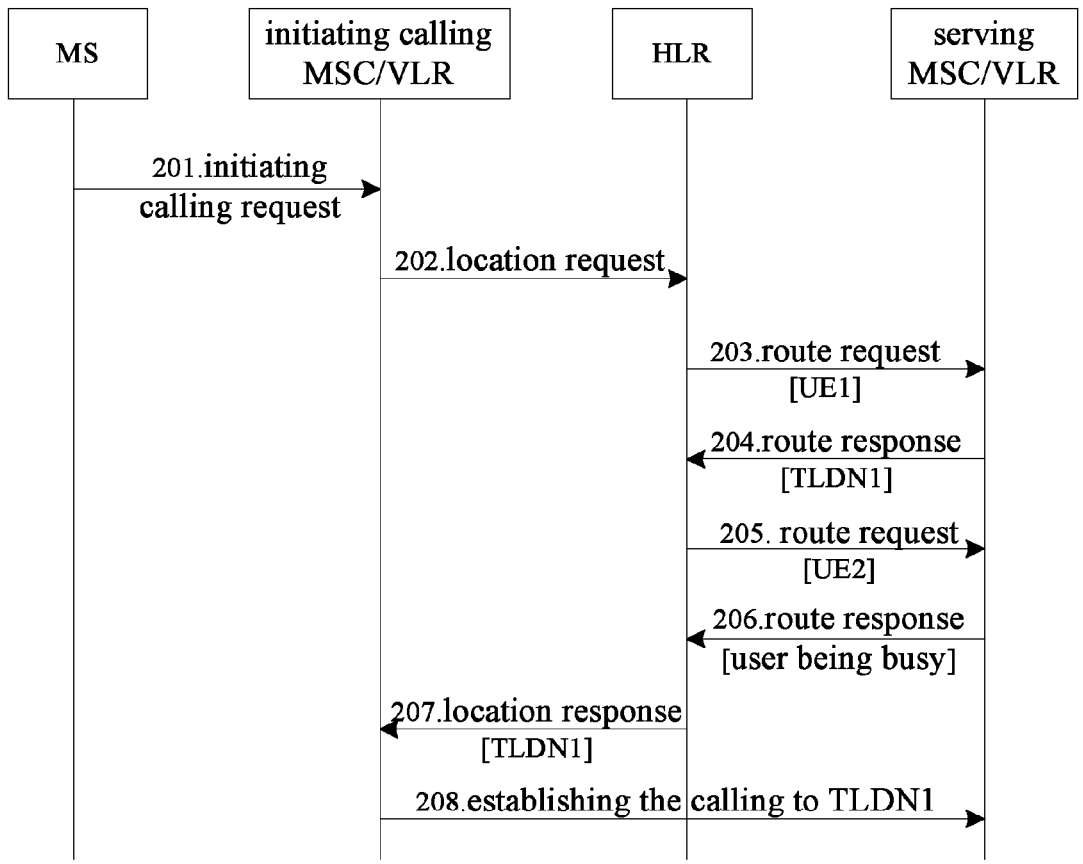
FIG. 2 is a flow chart showing the processing of multi-user type busyness based on home location register (HLR) according to prior art.
Figure 3:
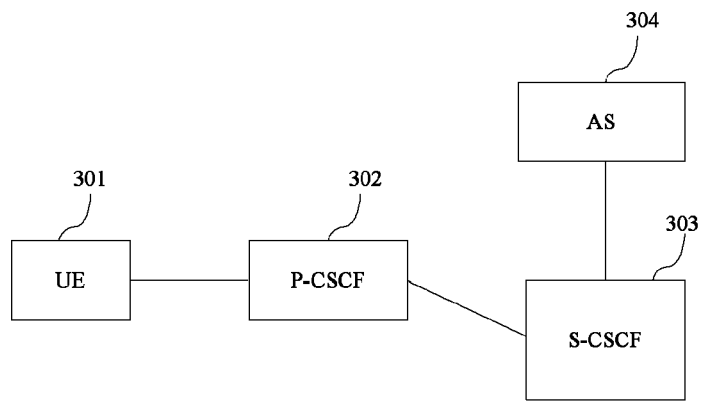
FIG. 3 is a schematic diagram showing the reference frame of IP multimedia subsystem (IMS) of FA according to prior art.

Preferably, the present invention is implemented under the above-mentioned IP multimedia subsystem (IMS) architecture. As shown in FIG. 3, P-CSCF is the session entrance point where a UE is accessed to the IMS network, and is responsible for forwarding the session between a UE and the network; S-CSCF is responsible for handling the session request from a UE and performing the initial filtering rule; AS is responsible for providing service of a UE/UEs, such as processing FA service.

Figure 4:
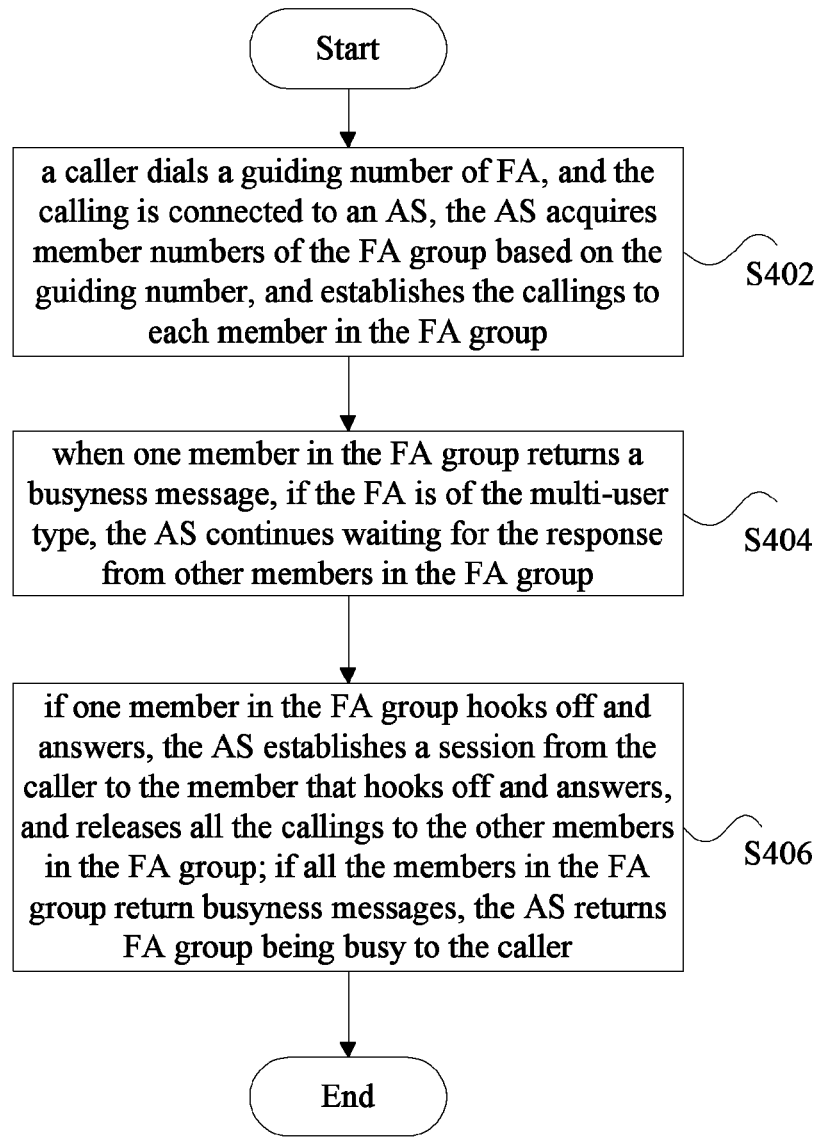
FIG. 4 is a flow chart showing the method for processing the busyness of multi-user FA group according to the embodiment of the present invention.

Based on the aforesaid IMS architecture, as shown in FIG. 4, the method for processing the busyness of FA group with multi-user type comprises:

Step S402, a caller dials a guiding number of FA, and the calling is connected to an AS, the AS acquires member numbers of the FA group based on the guiding number, and establishes the callings to each member in the FA group; Step S404, when one member in the FA group returns a busyness message, if the FA is of the multi-user type, the AS continues waiting for the response from other members in the FA group; Step S406, if one member in the FA group hooks off and answers, the AS establishes a session from the caller to the member that hooks off and answers, and releases all the callings to the other members in the FA group; if all the members in the FA group return busyness messages, the AS returns FA group being busy to the caller.

Wherein, in Step S402, the process that the calling is connected to the AS further comprises: the calling is connected to the S-CSCF to which the guiding number belongs; and the S-CSCF forwards the session request to the AS which processes FA service according to a filter.

Further, in Step S402, the process that the AS acquires member numbers of the FA group based on the guiding number, and establishes the callings to each member in the FA group further comprises: the AS judges the calling is a FA calling, inquires a member list of the FA group, and acquires the member numbers of the FA group; and the AS sends calling request to all the members in the FA group via the S-CSCF and the P-CSCF. In particular, the AS can simultaneously send the calling request to all the members in the FA group.

Correspondingly, the process that one or more members in the FA group return busyness message is: one or more members in the FA group return the busyness message to the AS via the P-CSCF and the S-CSCF. The process that one or more members in the FA group return off-hook and answering comprises: one or more members in the FA group return the off-hook and answering to the AS via the P-CSCF and the S-CSCF.

The method for processing the busyness of FA group with multi-user type according to the present invention will be described in connection with an example.

EXAMPLE

In the example, it is assumed that the FA group has two members UE1 and UE2, the caller is UE3, the FA group is of multi-user type, the FA group is busy only when all the members are busy, and the callings will be released.

Figure 5:
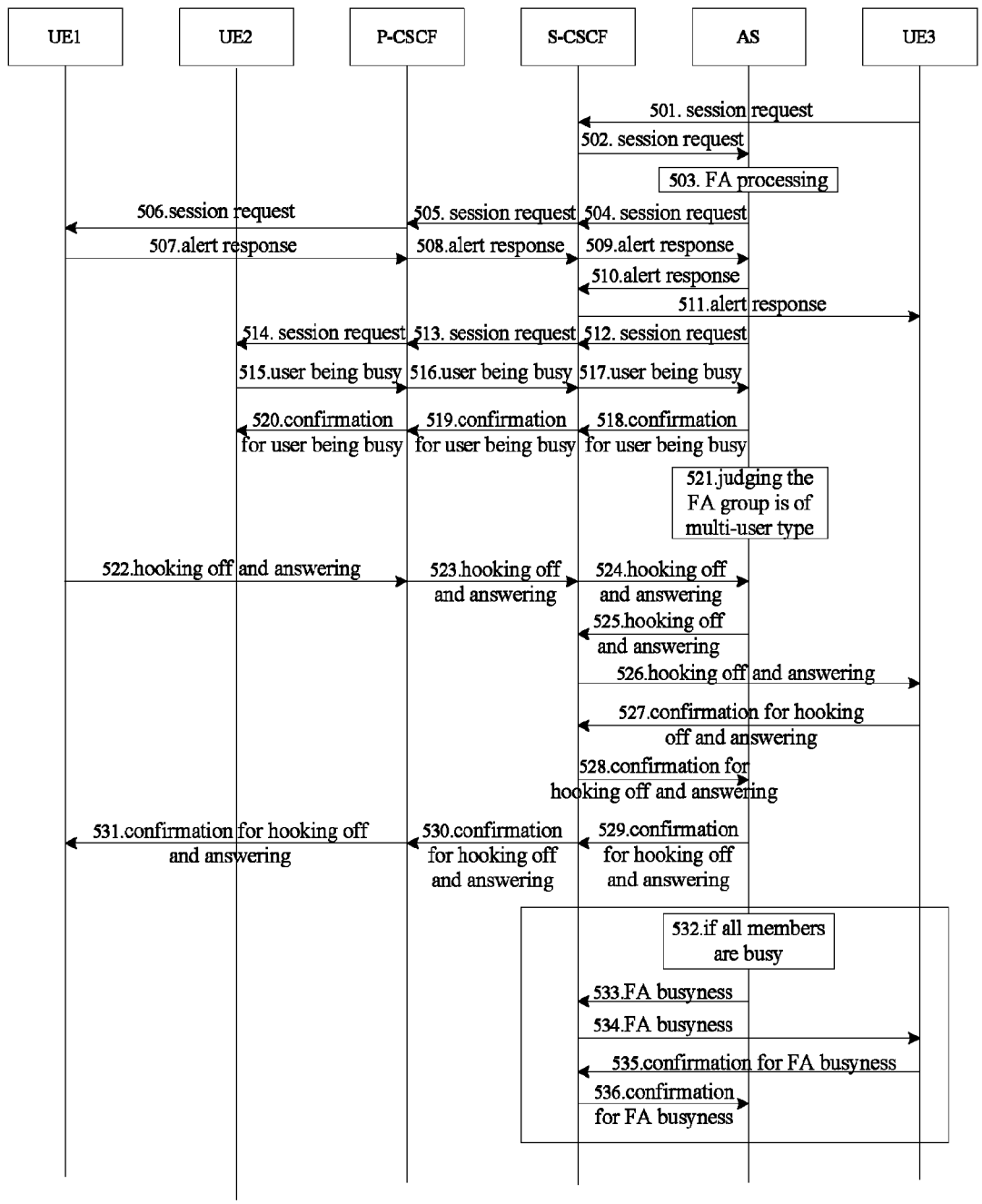
FIG. 5 is a detailed flow chart showing an application server (AS)-based process example of the method of FIG. 4.

As shown in FIG. 5, detailed processes are given hereafter:

Step 501-502, the caller UE3 initiating a calling by dialing the guiding number, the calling is connected to the S-CSCF to which the guiding number belongs, and the S-CSCF forwards the session request to the AS which processes FA service according to a filter;

Step 503-506, the AS judges the calling is a FA calling, inquires a member list of the FA group, selects the first member UE1, and sends session request to UE1; the session request is forwarded to UE1 via S-CSCF and P-CSCF;

Step 507-511, UE1 receives the request and returns an alert response which will be returned along the initial path for the session and will be delivered to UE3;

Step 512-514, AS initiates a session request to the second member UE2 (the step can be simultaneously processed with Step 503-511);

Step 515-520, UE2 returns user being busy, the AS returns confirmation for user being busy to UE2;

Step 521-531, if the FA group is of multi-user type, the AS continues waiting for the response from other members. When UE1 hooks off and answers, a session to the caller will be established. If there is any other branch which is establishing calling, all session relating to these branches will be released;

Step 532-536, if all of the users returns busyness, the AS returns busyness to the caller and ends the session.

Although the above example is described in the instance that the FA group comprises 2 members, the present invention is applicable to the instance that the FA group comprising one or more members, in the process of which, when one member responses, the AS establishes a calling, and then releases the calling establishment to other members.

It is noted that the example of the present invention comprises only member user of the IMS, but the present invention is applicable to the circumstance that the FA group comprises other users, such as PSTN users, MSC users, etc.

Above description is to illustrate the preferred embodiments not limit the present invention. Various alterations and changes to the present invention are apparent to those skilled in the art. The scope defined in claims shall comprise any modification, equivalent substitution and improvement in the spirit and principle of the present invention.

What is claimed is:

1. A method for processing the busyness of flexible alert group with multi-user type, wherein, the method comprises:

a caller dials a guiding number of Flexible Alert (FA), and the calling is connected to an application server, the said application server acquires member numbers of the FA group based on the said guiding number, and establishes the callings to each member in the said FA group;

when one member in the said FA group returns a busyness message, if the said FA is of the multi-user type, the said application server continues waiting for the response from other members in the said FA group; and if one member in the said FA group hooks off and answers, the said application server establishes a session from the said caller to the member that hooks off and answers, and releases all the callings to the other members in the said FA group; if all the members in the said FA group return busyness messages, the said application server returns FA group being busy to the said caller;

wherein the process that the said calling is connected to the said application server further comprises: the calling is connected to the Serving-Call Session Control Function, S-CSCF, to which the guiding number belongs; and the said S-CSCF forwards the session request to the said application server which processes FA service according to a filter.

2. The method for processing the busyness of flexible alert group with multi-user type according to claim 1, wherein, the process that the said application server acquires member numbers of the FA group based on the said guiding number, and establishes the callings to each member in the said FA group further comprises:

the said application server judges the calling is a FA calling, and inquires a member list of the said FA group, and acquires the member numbers of the said FA group; and the said application server sends calling request to all the members in the said FA group via the said S-CSCF and Proxy-Call Session Control Function, P-CSCF.

3. The method for processing the busyness of flexible alert group with multi-user type according to claim 2, wherein, the said application server simultaneously sends the said calling request to all the members in the said FA group.

4. The method for processing the busyness of flexible alert group with multi-user type according to claim 2, wherein, the process that one or more members in the said FA group return busyness message is:

one or more members in the said FA group return the said busyness message to the said application server via the said P-CSCF and the said S-CSCF.

5. The method for processing the busyness of flexible alert group with multi-user type according to claim 2, wherein, the process that one or more members in the said FA group return off-hook and answering comprises:

one or more members in the FA group return the said off-hook and answering to the said application server via the said P-CSCF and the said S-CSCF.

* * * * *